United States Patent [19]

Hillman

[11] Patent Number: 4,519,526
[45] Date of Patent: May 28, 1985

[54] METHOD AND APPARATUS FOR DISPENSING LIQUID

[75] Inventor: Gary Hillman, Livingston, N.J.

[73] Assignee: Machine Technology, Inc., Whippany, N.J.

[21] Appl. No.: 361,803

[22] Filed: Mar. 25, 1982

[51] Int. Cl.$^3$ ............................................. B65D 37/00
[52] U.S. Cl. ................................. 222/212; 222/214; 222/571
[58] Field of Search ............... 222/108, 129, 152, 183, 222/209, 214, 394, 397, 444, 436, 206, 215, 571, 212, 131; 251/5; 141/116, 117, 119

[56] References Cited

U.S. PATENT DOCUMENTS

| 2,884,165 | 4/1959 | Moeller | 222/212 |
| 3,511,468 | 5/1970 | Young | 251/6 |
| 3,895,748 | 7/1975 | Klingenberg | 141/117 |
| 3,982,724 | 9/1976 | Citrin | 251/7 |
| 3,985,268 | 10/1976 | Wood | 222/214 |
| 3,998,103 | 12/1976 | Björklund et al. | 222/215 |
| 4,030,640 | 6/1977 | Citrin et al. | 222/207 |
| 4,095,722 | 6/1978 | Miller | 222/214 |
| 4,234,885 | 11/1980 | Arway | 222/214 |
| 4,369,664 | 1/1983 | Bunce et al. | 222/214 |

FOREIGN PATENT DOCUMENTS 2316481 10/1973 Fed. Rep. of Germany ...... 222/214

OTHER PUBLICATIONS

Cascio et al., IBM Technical Disclosure Bulletin, vol. 20, No. 1, (Jun. 1977).

*Primary Examiner*—Joseph J. Rolla
*Assistant Examiner*—Michael S. Huppert
*Attorney, Agent, or Firm*—Lerner, David, Littenberg, Krumholz & Mentlik

[57] ABSTRACT

An anti-drip system for a dispenser in the form of a deformable conduit adapted to dispense a liquid, such as a photoresist, from a dispensing tip located at one end of the conduit includes a rigid housing which surrounds an intermediate portion of the conduit. The housing is closed except for a port which permits pressurized air to be supplied to and exhausted from the housing. At the commencement of a dispensing operation, the liquid is transported through the conduit as the housing is simultaneously pressurized, thereby crimping the intermediate portion of the conduit. At the conclusion of the dispensing operation, air pressure in the housing is simultaneously reduced, thereby allowing the conduit to expand and assume its natural substantially uncrimped shape. Expansion of the conduit creates a vacuum sufficient to suck back liquid which is being dispensed from the conduit. A pair of anti-drip systems may be utilized in combination with a pair of valves to actually meter liquid which is being dispensed through a deformable conduit.

20 Claims, 2 Drawing Figures

METHOD AND APPARATUS FOR DISPENSING LIQUID

FIELD OF THE INVENTION

The present invention relates to methods and apparatus for controlling the dispensation of liquid through a deformable conduit, and, more particularly, to such methods and apparatus which inhibit the liquid from dripping at the conclusion of the dispensing operation.

BACKGROUND OF THE INVENTION

In the manufacture of semiconductors and similar devices, it is often necessary to repeatedly dispense metered amounts of liquid, such as a photoresist, onto a workpiece, such as a wafer. Heretofore, the liquid has been supplied to the workpiece by a dispenser which includes a flexible conduit and a three-way valve designed to control the flow of liquid through the conduit. At the conclusion of the dispensing operation, it has been found that liquid residue tends to collect at an outlet of the dispenser. The liquid, especially if it is a photoresist, may crystallize upon contact with air. Therefore, if a liquid residue collects at the outlet of the dispenser, the residue will often crystallize. Such a crystallized residue is undesirable, inasmuch as portions of the crystallized residue can be dislodged during subsequent dispensing operations and deposited on the workpieces. These deposited portions of the crystallized residue are undesirable because they can create an uneven or otherwise defective coating on the workpieces.

Pinch valves have been developed which employ deformable tubes to dispense metered amounts of liquid in a dripless manner (see, for instance, U.S. Pat. Nos. 4,030,640; 3,982,724; 3,511,468 and 2,884,165). All of these prior devices utilize pistons, platens or similar mechanical elements as pinch valves to physically deform the tubes in order to control the dispensation of the liquid. These pinch valves cause the tubes to fatique, thereby limiting the operating life of the prior devices. Also, inasmuch as the pinch valves usually consist of seberal moving parts, the pinch valves are subject to frequent breakdowns, resulting in rather long periods of machine downtime.

SUMMARY OF THE INVENTION

The problems and disadvantages of the prior art device described above are overcome in accordance with the present invention by providing new and improved methods and apparatus for dispensing liquid and for inhibiting drippage of the liquid at the conclusion of the dispensing operation. More particularly, the new and improved methods and apparatus utilize a deformable conduit adapted to discharge or dispense liquid therefrom. In accordance with the present invention, the conduit passes through a housing which is adapted for pressurization and depressurization. During a dispensing operation, liquid is transported through the conduit as the housing is simultaneously pressurized to a pressure specifically selected to crimp the conduit solely by the forces applied directly to it as a result of the pressurization of the housing (i.e., the conduit is crimped without utilizing any mechanical advantage). At the conclusion of the dispensing operation, the housing is depressurized to an extent sufficient to allow the conduit to expand and assume its natural substantially uncrimped state. The expansion of the conduit creates a vacuum sufficient to suck back liquid which is being dispensed or discharged from the conduit, thereby inhibiting the liquid from dripping out of the conduit or out of a dispensing tip attached thereto. By inhibiting drippage, the present invention also inhibits the collection of solidified or crystallized liquid residue at an outlet of the conduit or at an orifice of the dispensing tip. Inasmuch as the conduit is not mechanically crimped, the present invention does not fatigue the conduit as much as the pinch valves employed by the prior art devices discussed above. Also, by eliminating the mechanical pinch valves of the prior art devices, the present invention is much simpler to operate and maintain than the prior art devices.

By utilizing a pair of pressurized housings, the present invention can actually be employed to dispense metered amounts of liquid through a deformable conduit which passes through the housings, as well as to inhibit drippage of the liquid at the end of the dispensing operation. For instance, after filling the conduit with liquid and then closing off an inlet end of the conduit, both of the housings are pressurized to crimp the conduit and thereby discharge a predetermined amount of liquid from an open outlet end of the conduit. At the conclusion of the dispensing operation, the conduit would be closed off between the housings and its inlet end would be opened. Next, the housings are depressurized to permit upstream and downstream portions of the conduit to expand and assume their natural substantially uncrimped shape. The expansion of the upstream portion increases its volume and thereby creates a vacuum sufficient to fill the upstream portion with liquid sucked through the inlet end of the conduit. The expansion of the downstream portion increases its volume and thereby creates a vacuum sufficient to suck back liquid which is being dispensed from the outlet end of the conduit.

BRIEF DESCRIPTION OF THE DRAWINGS

For a more complete understanding of the present invention, reference may be had to the following discussion of two exemplary embodiments considered in conjunction with the accompanying drawings, in which.

DESCRIPTION OF THE EXEMPLARY EMBODIMENTS

While the present invention may be used to dispense any type of liquid, it is especially suitable for use in dispensing photoresist employed in connection with the manufacture of semiconductors and similar devices. Thus, the present invention will be described with particular reference to photoresist dispensing systems.

Figure 1:
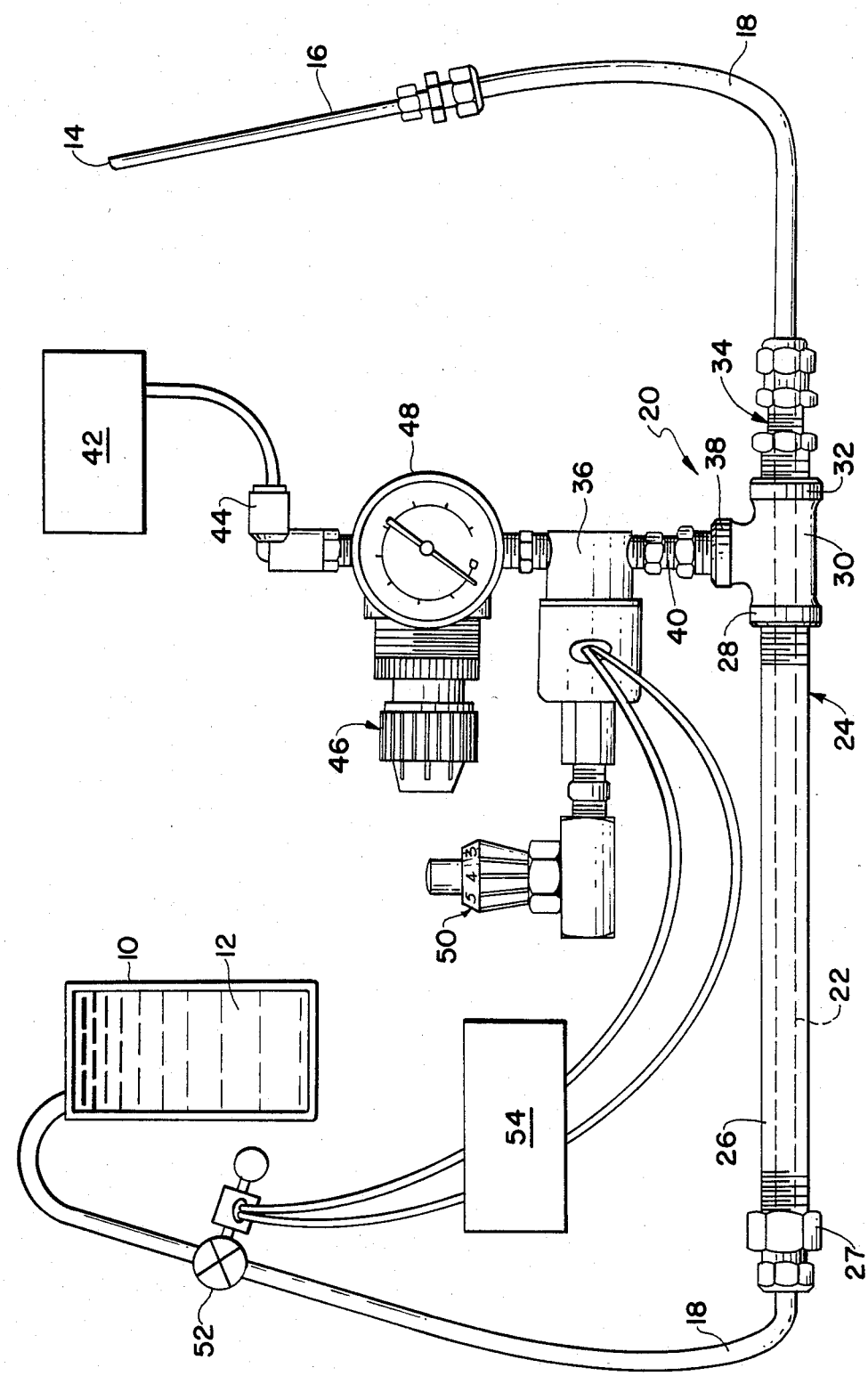
FIG. 1 is a schematic representation of a suck-back assembly constructed in accordance with one embodiment of the present invention.

With reference to FIG. 1, there is shown a photoresist dispensing system which includes a reservoir 10 containing photoresist 12 to be dispensed from an orifice 14 of a dispensing tip 16 onto a workpiece (not shown). The reservoir 10 is connected to the dispensing tip 16 by a deformable conduit 18. Both the dispensing tip 16 and the conduit 18 are made from semi-rigid tubing sold under the trade name Teflon TFE. The conduit 18 may, for example, have an outside diameter of 0.250 inches and a wall thickness of 0.030 inches.

A suck-back assembly 20 is positioned over an intermediate portion 22 of the conduit 18. The suck-back assembly 20 includes a rigid housing 24 made primarily from a steel pipe 26. An upstream end of the housing 24 is closed off by a fitting 27, which is threaded onto a corresponding end of the steel pipe 26. The opposite end of the steel pipe 26 is threaded into one leg 28 of a T-fitting 30. A second leg 32 of the T-fitting 30 threadedly receives a composite fitting 34, which closes a downstream end of the housing 24. A three-way valve 36 is connected to a third leg 38 of the T-fitting 30 by a fitting 40. The three-way valve 36 is supplied with compressed air from a source 42 of compressed air through an air inlet 44. A regulator 46 is positioned between the air inlet 44 and the three-way valve 36 for regulating the pressure of the compressed air which is supplied to the three-way valve 36. A gauge 48 is associated with regulator 46 to give a visible indication of the pressure of the compressed air. An adjustable metering valve 50 is attached to the three-way valve 36 to control the flow of air discharged to the atmosphere from the three-way valve 36.

Another three-way valve 52 is arranged in the conduit 18 between the suck-back assembly 20 and the reservoir 10. A microprocessor 54 is connected to the three-way valves 36, 52 in order to control their operation.

In the normal initial operation of the dispensing system of FIG. 1, the three-way valve 52 is opened to fill the conduit 18 and the dispensing tip 16 with the photoresist 12 contained in the reservoir 10. After the conduit 18 and the dispensing tip 16 have been completely filled, the three-way valve 52 is closed.

In order to dispense metered amounts of the photoresist 12 from the dispensing tip 16, the three-way valves 36, 52 are simultaneously energized. When the three-way valve 52 is energized, it permits the constantly pressurized photoresist 12 to flow from the reservoir 10 into the conduit 18, thereby displacing an equal amount of the photoresist 12 which had already been supplied to the conduit 18 and the dispensing tip 16. Thus, the three-way valve 52 controls the amount of the photoresist 12 which is dispensed from the dispensing tip 16. The energization of the three-way valve 36 permits the compressed air from the source 42 to enter the housing 24. Thus, during the dispensation of the photoresist 12 from the dispensing tip 16, the housing 24 can be pressurized to a pressure which crimps but does not close the intermediate portion 22 of the conduit 18 along substantially the entire length of the housing 24. The degree to which the intermediate portion 22 of the conduit 18 is crimped depends upon the value of the pressure within the housing 24.

After a predetermined amount of the photoresist 12 has been dispensed from the dispensing tip 16, the three-way valves 36, 52 are simultaneously de-energized. When the three-way valve 52 is de-energized, it prevents the photoresist 12 in the reservoir 10 from entering the conduit 18. The de-energization of the three-way valve 36 cuts off the flow of compressed air into the housing 24, while opening the housing 24 to the atmosphere through the metering valve 50 so as to exhaust the compressed air from the housing 24 and thereby depressurize it. The metering valve 50 retards or delays the complete exhaustion of the housing 24 to insure that the housing 24 is not completely exhausted until the three-way valve 52 is completely closed. Alternatively, the de-energization of the three-way valve 36 can be delayed for a short period of time after the de-energization of the three-way valve 52, thus eliminating the need to provide the metering valve 50.

Once the housing 24 is sufficiently depressurized, the natural resiliency of the conduit 18 causes the intermediate portion 22 to expand and assume its natural substantially uncrimped shape. The expansion of the intermediate portion 22 causes a corresponding increase in the volume of the conduit 18 and the consequent creation of a partial vacuum therein. As a result of the vacuum created in the conduit 18, the photoresist 12 in the vicinity of the orifice 14 of the dispensing tip 16 is sucked back into the dispensing tip 16, thereby inhibiting drippage of the photoresist 12 from the dispensing tip 16 and its subsequent crystallization around the orifice 14.

In order to discharge another metered amount of the photoresist 12 from the dispensing tip 16, the abovedescribed steps would be sequentially repeated. Each time these steps are repeated a metered amount of the photoresist 12 would be dispensed from the dispensing tip 16.

Figure 2:
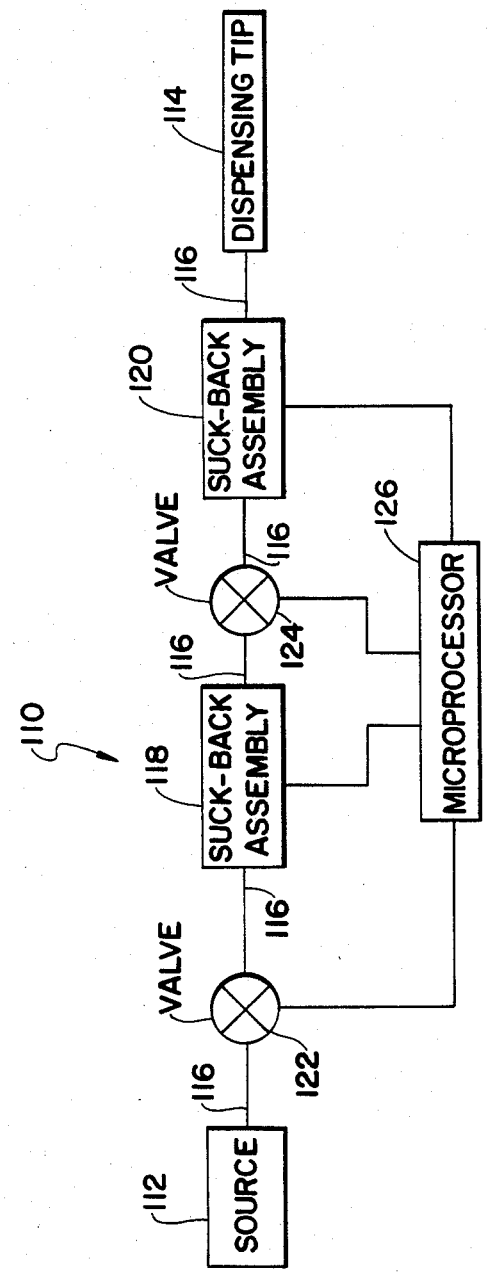
FIG. 2 is a block diagram of a dispensing system constructed in accordance with another embodiment of the present invention.

Referring now to FIG. 2, there is shown a photoresist dispensing system 110 which includes a non-pressurized source 112 of a photoresist to be dispensed, a dispensing tip 114 for dispensing the photoresist and a deformable conduit 116 which connects the source 112 of the photoresist to the dispensing tip 114. Two suck-back assemblies 118, 120 are arranged along the conduit 116 between the source 112 and the dispensing tip 114. The design and construction of the suck-back assemblies 118, 120 are substantially identical to the design and construction of the suck-back assembly 20 of FIG. 1. Two three-way valves 122, 124 are also provided along the conduit 116. The valve 122 is positioned between the suck-back assembly 118 and the source 112, while the valve 124 is positioned between the two suck-back assemblies 118, 120.

In the normal initial operation of the dispensing system of FIG. 2, the valves 122, 124 are energized or opened so that the conduit 116 and the dispensing tip 114 can be filled with photoresist. After the conduit 116 and the dispensing tip 114 have been completely filled with photoresist, the valve 122 is de-energized or closed, while the valve 124 remains energized or open. The two suck-back assemblies 118, 120 are then operated in the same manner as the suck-back assembly 20 of FIG. 1 to crimp the conduit 116 in two separate locations and thereby displace photoresist from the dispensing tip 114. The amount of photoresist dispensed from the dispensing tip 114 is determined by the amount of decrease in the volume of the conduit 116 as a result of its being crimped by the suck-back assemblies 118, 120.

After the dispensing operation is completed, the valve 124 is de-energized or closed and the valve 122 is energized or opened, while the two suck-back assemblies 118, 120 are opened to the atmosphere to permit the conduit 116 to expand and assume its natural substantially uncrimped shape. The expansion of the conduit 116 in the vicinity of the suck-back assembly 118 creates a partial vacuum in an upstream portion of the conduit 116, resulting in photoresist being sucked into the upstream portion of the conduit 116 from the source 112. The expansion of the conduit 116 in the vicinity of the suck-back assembly 120 creates a partial vacuum in a downstream portion of the conduit 116, resulting in the suck back of photoresist into the dispensing tip 114.

In order to discharge another metered amount of photoresist from the dispensing tip 114, the abovedescribed steps would be sequentially repeated. Each time these steps are repeated a metered amount of photoresist would be dispensed from the dispensing tip 114.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

I claim:

1. A suck-back assembly for use with liquid dispensers, comprising a housing; conveying means for conveying liquid to be dispensed, said conveying means including a resiliently deformable conduit passing through said housing and a constantly open dispensing tip; pressurizing means for pressurizing said housing; and regulating means for regulating the pressure within said housing between a first predetermined pressure at which said conduit is crimped solely by the forces applied directly to it as a result of said housing being at said first predetermined pressure and a second predetermined pressure at which said conduit is substantially uncrimped, whereby the volume of said conduit is increased when said conduit returns to its substantially uncrimped state from its crimped state to thereby create a vacuum in said conduit sufficient to suck back liquid which is being dispensed from said constantly open dispensing tip.

2. A suck-back assembly according to claim 1, wherein said regulating means includes varying means for varying the value of said first predetermined pressure.

3. A suck-back assembly according to claim 1, further comprising supplying means for supplying constantly pressurized liquid to said conveying means and controlling means for controlling the supply of pressurized liquid to said conveying means from said supplying means.

4. A suck-back assembly according to claim 3, wherein said controlling means includes a first valve movable between an open position in which said first valve permits pressurized liquid to flow to said conveying means from said supplying means and a closed position in which said first valve prevents pressurized liquid from flowing to said conveying means from said supplying means.

5. A suck-back assembly according to claim 4, wherein said pressurizing means includes a source of pressurized fluid and connecting means for connecting said source of pressurized fluid to said housing and wherein said regulating means includes a second valve arranged in said connecting means and movable between a first position in which said second valve permits pressurized fluid to flow from said source to said housing and a second position in which said second valve connects said housing to the atmosphere, whereby pressurized fluid is exhausted from said housing when said second valve is in its second position.

6. A suck-back assembly according to claim 5, further comprising synchronizing means for synchronizing the operation of said first and second valves such that said first valve is moved to its open position at the same time that said second valve is moved to its first position and such that said first valve is moved to its closed position at the same time that said second valve is moved to its second position and retarding means for retarding the flow of pressurized fluid exhausted to the atmosphere from said housing, whereby pressurized fluid is completely exhausted from said housing only after said first valve has assumed its closed position.

7. A suck-back assembly according to claim 5, further comprising synchronizing means for synchronizing the operation of said first and second valves such that said first valve is moved to its open position at the same time that said second valve is moved to its first position and such that said first valve is moved to its closed position before said second valve is moved to its second position.

8. A suck-back assembly according to claim 1, wherein said conduit is made from a semi-rigid material and said housing is made from a rigid material.

9. A suck-back assembly according to claim 8, wherein said semi-rigid material comprises a polymer of tetrafluoroethylene.

10. A dispenser for liquid, comprising a first housing; a second housing; conveying means for conveying liquid to be dispensed, said conveying means including a resiliently deformable conduit passing through said first and second housings and having an inlet and an outlet; pressurizing means for pressurizing said first and second housings; first regulating means for regulating the pressure within said first housing between a first predetermined pressure at which an upstream portion of said conduit is crimped solely by the forces applied directly to it as a result of said first housing being at said first predetermined pressure and a second predetermined pressure at which said upstream portion of said conduit is substantially uncrimped; second regulating means for regulating the pressure within said second housing between a third predetermined pressure at which a downstream portion of said conduit is crimped solely by the forces applied directly to it as a result of said second housing being at said third predetermined pressure and a fourth predetermined pressure at which said downstream portion of said conduit is substantially uncrimped; first controlling means arranged in said conduit between said first housing and said inlet for controlling the flow of liquid through said conduit such that in an open position said first controlling means permits liquid to flow through said conduit and in a closed position said first controlling means prevents liquid from flowing through said conduit; second controlling means arranged in said conduit between said first and second housings for controlling the flow of liquid through said conduit such that in an open position said second controlling means permits liquid to flow through said conduit and in a closed position said second controlling means prevents liquid from flowing through said conduit; synchronizing means for synchronizing the operation of said first and second regulating means and said first and second controlling means such that said first and second regulating means generate said first and third predetermined pressures in said first and second housings, respectively, not before said first controlling means assumes its closed position and said second controlling means assumes its open position, whereby said first and second regulating means cooperate with each other to decrease the volume of said conduit and thereby discharge a predetermined amount of liquid from said outlet, and such that said first and second regulating means generate said second and fourth predetermined pressures in said first and second housings, respectively, not before said first controlling means assumes its open position and said second controlling means assumes its closed position, whereby said first regulating means increases the volume of said upstream portion of said conduit to create a vacuum in said upstream portion sufficient to fill said upstream portion with liquid sucked through said inlet and said second regulating means increases the volume of said downstream portion of said conduit to create a vacuum therein sufficient to suck back liquid which is being discharged from said outlet.

11. A dispenser according to claim 10, wherein said first regulating means includes first varying means for varying the value of said first predetermined pressure and said second regulating means includes second varying means for varying the value of said third predetermined pressure.

12. A dispenser according to claim 10, wherein said conduit is made from a semi-rigid material and said first and second housings are made from a rigid material.

13. A dispenser according to claim 11, wherein said semi-rigid material comprises a polymer of tetrafluoroethylene.

14. A method of dispensing liquid from a resiliently deformable conduit passing through a pair of housings, comprising the steps of filling said conduit with liquid; closing off one end of said conduit; pressurizing one of said housings to a first predetermined pressure selected such that an upstream portion of said conduit is crimped soley by the forces applied directly to it as a result of said one housing being at said first predetermined pressure, whereby the volume of said upstream portion of said conduit is decreased to thereby discharge a predetermined amount of liquid from an opposite end of said conduit; pressurizing the other housing to a second predetermined pressure selected such that a downstream portion of said conduit is crimped solely by the forces applied directly to it as a result of said other housing being at said second predetermined pressure, whereby the volume of said downstream portion of said conduit is decreased to thereby discharge a predetermined amount of liquid from said opposite end of said conduit; closing off said conduit between said housings; opening said one end of said conduit; depressurizing said one housing to a third predetermined pressure selected such that said upstream portion of said conduit is substantially uncrimped when said one housing is at said second predetermined pressure, whereby the volume of said upstream portion of said conduit is increased when said upstream portion returns to its substantially uncrimped state from its crimped state to thereby create a vacuum in said upstream portion sufficient to fill said upstream portion with liquid sucked through said one end of said conduit; and depressurizing said other housing to a fourth predetermined pressure selected such that said downstream portion of said conduit is substantially uncrimped when said other housing is at said fourth predetermined pressure, whereby the volume of said downstream portion of said conduit is increased when said downstream portion returns to its substantially uncrimped state from its crimped state to thereby create a vacuum in said downstream portion sufficient to suck back liquid which is being dispensed from said opposite end of said conduit.

15. A suck-back assembly for use with liquid dispensers, comprising a housing; conveying means for conveying liquid to be dispensed, said conveying means including a resiliently deformable conduit passing through said housing; supplying means for supplying constantly pressurized liquid to said conveying means; controlling means for controlling the supply of pressurized liquid to said conveying means from said supplying means, said controlling means including a first valve movable between an open position in which said first valve permits pressurized liquid to flow to said conveying means from said supplying means and a closed position in which said first valve prevents pressurized liquid from flowing to said conveying means from said supplying means; a source of pressurized fluid; connecting means for connecting said source of pressurized fluid to said housing; and regulating means for regulating the pressure within said housing between a first predetermined pressure at which said conduit is crimped solely by the forces applied directly to it as a result of said housing being at said first predetermined pressure and a second predetermined pressure at which said conduit is substantially uncrimped, whereby the volume of said conduit is increased when said conduit returns to its substantially uncrimped state from its crimped state to thereby create a vacuum in said conduit sufficient to suck back liquid which is being dispensed, said regulating means including a second valve arranged in said connecting means and movable between a first position in which said second valve permits pressurized fluid to flow from said source of pressurized fluid to said housing and a second position in which said second valve connects said housing to the atmosphere, whereby pressurized fluid is exhausted from said housing when said second valve is in its second position.

16. A suck-back assembly according to claim 15, further comprising synchronizing means for synchronizing the operation of said first and second valves such that said first valve is moved to its open position at the same time that said second valve is moved to its first position and such that said first valve is moved to its closed position at the same time that said second valve is moved to its second position and retarding means for retarding the flow of pressurized fluid exhausted to the atmosphere from said housing, whereby pressurized fluid is completely exhausted from said housing only after said first valve has assumed its closed position.

17. A suck-back assembly according to claim 15, further comprising synchronizing means for synchronizing the operation of said first and second valves such that said first valve is moved to its open position at the same time that said second valve is moved to its first position and such that said first valve is moved to its closed position before said second valve is moved to its second position.

18. A suck-back assembly according to claim 15, wherein said regulating means includes varying means for varying the value of said first predetermined pressure.

19. A suck-back assembly according to claim 15, wherein said conduit is made from a semi-rigid material and said housing is made from a rigid material.

20. A suck-back assembly according to claim 19, wherein said semi-rigid material comprises a polymer of tetrafluoroethylene.

* * * * *

UNITED STATES PATENT AND TRADEMARK OFFICE
CERTIFICATE OF CORRECTION

PATENT NO. : 4,519,526
DATED : May 28, 1985
INVENTOR(S) : Gary Hillman

It is certified that error appears in the above-identified patent and that said Letters Patent is hereby corrected as shown below:

Column 1, line 42, change "seberal" to --several--; and

Column 7, Claim 13, line 1, change "11" to --12--.

Signed and Sealed this

Fifteenth Day of October 1985

[SEAL]

Attest:

DONALD J. QUIGG

Attesting Officer

Commissioner of Patents and
Trademarks—Designate